United States Patent
Liu et al.

(10) Patent No.: US 8,433,068 B2
(45) Date of Patent: Apr. 30, 2013

(54) METHOD AND APPARATUS FOR COMMUNICATION BASED ON PSEUDO-CONTACT INFORMATION

(75) Inventors: Kai Liu, Shenzhen (CN); Zhiping Zhang, Shenzhen (CN); Yongli Zuo, Shenzhen (CN); Qingpeng Duan, Shenzhen (CN); Bin Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/577,915

(22) PCT Filed: Sep. 20, 2010

(86) PCT No.: PCT/CN2010/077144
§ 371 (c)(1),
(2), (4) Date: Aug. 9, 2012

(87) PCT Pub. No.: WO2011/153748
PCT Pub. Date: Dec. 15, 2011

(65) Prior Publication Data
US 2012/0314860 A1  Dec. 13, 2012

(30) Foreign Application Priority Data
Jun. 11, 2010 (CN) .......................... 2010 1 0200708

(51) Int. Cl.
*H04K 1/00* (2006.01)

(52) U.S. Cl.
USPC ........... 380/247; 380/248; 380/249; 380/250; 726/26; 726/27; 726/28; 726/29; 726/30

(58) Field of Classification Search .................... 380/247
See application file for complete search history.

(56) References Cited

U.S. PATENT DOCUMENTS
7,436,962 B2 * 10/2008 Rodriguez et al. ............ 380/257
2009/0054044 A1   2/2009 Ikemori et al.

FOREIGN PATENT DOCUMENTS
| | | |
|---|---|---|
| CN | 101026822 A | 8/2007 |
| CN | 101304453 A | 11/2008 |
| CN | 101370209 A | 2/2009 |
| WO | 2007080629 A1 | 7/2007 |

OTHER PUBLICATIONS

International Search Report in international application No. PCT/CN2010/077144, mailed on Mar. 17, 2011.
English Translation of the Written Opinion of the International Search Authority in international application No. PCT/CN2010/077144, mailed on Mar. 17, 2011.

* cited by examiner

*Primary Examiner* — Longbit Chai
(74) *Attorney, Agent, or Firm* — Oppedahl Patent Law Firm LLC

(57) ABSTRACT

The disclosure discloses a method for communication based on pseudo-contact information, which including: when a call is received, acquiring contact information of a calling party, and encrypting the contact information by using a preset encryption algorithm to acquire pseudo-contact information; when the pseudo-contact information does not match locally stored pseudo-contact information, displaying real contact information of the calling party, wherein the locally stored pseudo-contact information represents the pseudo-contact information generated by encrypting the contact information to be stored according to the preset encryption algorithm and locally stored; and when the pseudo-contact information matches the locally stored pseudo-contact information, displaying a substituted contact information generated by substituting a plurality of bits of the real contact information of the calling party with an identifier. The disclosure further discloses another method for communication based on pseudo-contact information and an apparatus for communication based on pseudo-contact information. The disclosure can solve the problems of higher operation complexity and lower safety performance of the method for protecting contact information stored on a terminal mentioned in the related art.

16 Claims, 8 Drawing Sheets

METHOD AND APPARATUS FOR COMMUNICATION BASED ON PSEUDO-CONTACT INFORMATION

TECHNICAL FIELD

The embodiments of the disclosure relate to the field of mobile communication and information security, and in particular to a method and a apparatus for communication based on pseudo-contact information in the field.

BACKGROUND

With continuous enhancement of functions of various terminals (such as a mobile phone, a computer and a point-of-sale terminal), and continuous increasing of the transmission speed of a wireless network, the terminal is applied more and more widely, and more and more personal information, such as a telephone number, a short message, a multimedia message, an e-mail and the like, are stored in the terminal, and these important information may bring losses to a subscriber if being revealed. At present, a small terminal, such as a mobile phone, is easy to lose, so that personal information is also easy to be revealed. For example, if a personal mobile phone is stolen, a lawless person may call a relative or a friend whose contact information is stored in the mobile phone for fraud; and for another example, once contact information of a business person is stolen, a great economic loss may be brought to a company due to disclosure of a secret.

At present, there are many kinds of technologies or methods for protecting personnel information of a terminal, which mainly include: remote controlling the terminal, hiding data on the terminal, etc. In general, data protection for a terminal, particularly protection for contact information, is relatively limited, complex to operate and not ideal in effect in the related art; if a thief transfers a Subscriber Identification Module (SIM) card of a mobile phone subscriber to other mobile phones, it is still possible to acquire contact information stored in the SIM card by the subscriber, so that the contact information cannot be protected successfully and has lower safety performance.

SUMMARY

In view of the problem above, one embodiment of the disclosure provides a method for communication based on pseudo-contact information, so as to solve the problems of higher operation complexity and lower safety performance of the method for protecting contact information stored on a terminal mentioned in the related art.

In order to solve the problems, the technical solution of the disclosure is implemented as follows.

A method for communication based on pseudo-contact information is provided, which includes: when a call is received, acquiring contact information of a calling party, and encrypting the contact information of the calling party by using a preset encryption algorithm to acquire pseudo-contact information of the calling party; when the pseudo-contact information of the calling party does not match locally stored pseudo-contact information, displaying real contact information of the calling party, wherein the locally stored pseudo-contact information represents the pseudo-contact information generated by encrypting the contact information to be stored according to the preset encryption algorithm and locally stored; and when the pseudo-contact information of the calling party matches the locally stored pseudo-contact information, displaying a substituted contact information generated by substituting at least one bit of the real contact information of the calling party with an identifier.

The locally storing of the pseudo-contact information may further include: periodically changing the preset encryption algorithm, and encrypting and storing the contact information to be stored by the periodically-changed preset encryption algorithm, and/or storing the pseudo-contact information in a local storage or a subscriber identity module (SIM) card of the terminal, and/or storing the pseudo-contact information containing any one or combination of telephone number, instant communication number and e-mail address.

Before encrypting the contact information of the calling party by using the preset encryption algorithm, the method may further include: judging whether a pseudo-contact information storage function is enabled, if yes, encrypting the contact information of the calling party by using the preset encryption algorithm, if not, directly displaying the contact information of the calling party; and/or, before acquiring the contact information of the calling party, judging whether a wireless function needs to be disabled, if yes, directly ending the current processing, otherwise, acquiring the contact information of the calling party.

Before judging whether the wireless function needs to be disabled, the method may further include: receiving a message containing a terminal locking instruction, and locking the local wireless function.

A method for communication based on the pseudo-contact information includes: when a call is initiated, acquiring the pseudo-contact information of the called party from the locally stored pseudo-contact information and decoding the pseudo-contact information of the called party, wherein the locally stored pseudo-contact information represents the pseudo-contact information generated by encrypting the contact information to be stored by using the preset encryption algorithm and locally stored, and dialing by using the decoded contact information of the called party and substituting at least one bit of the decoded contact information of the called party displayed with an identifier in the dialing process.

The locally storing of pseudo-contact information may further include: periodically changing the preset encryption algorithm, and encrypting and storing the contact information to be stored by the periodically-changed preset encryption algorithm, and/or storing the pseudo-contact information in a local terminal or a subscriber identity module (SIM) card of the terminal, and/or storing the pseudo-contact information containing any one or combination of telephone number, instant communication number and e-mail address.

Before acquiring the pseudo-contact information of the called party, the method may further include: judging whether a pseudo-contact information storage function is enabled, if yes, acquiring the pseudo-contact information of the called party from the locally stored pseudo-contact information, if not, directly displaying the contact information of the called party and making a call according to the contact information of the called party; and/or, before acquiring the pseudo-contact information of the called party, judging whether a wireless function needs to be disabled, if yes, directly ending the current processing, otherwise, acquiring the pseudo-contact information of the called party.

Before judging whether the wireless function needs to be disabled, the method may further include: receiving a message containing a terminal locking instruction, and locking the local wireless function.

An apparatus for communication based on the pseudo-contact information is provided, which includes: an acquiring unit configured to, when a call is received, acquire contact information of a calling party, and encrypt the contact information of the calling party by using the preset encryption algorithm to acquire pseudo-contact information of the calling party; a first display unit configured to, when the pseudo-contact information of the calling party does not match locally stored pseudo-contact information, display real contact information of the calling party, wherein the locally stored pseudo-contact information represents the pseudo-contact information generated by encrypting the contact information to be stored according to the preset encryption algorithm and locally stored; and a second display unit configured to, when the pseudo-contact information of the calling party matches the locally stored pseudo-contact information, display a substituted contact information generated by substituting at least one bit of the real contact information of the calling party with an identifier.

The apparatus may further include: a changing unit and an encrypting unit, wherein the changing unit is configured to periodically change the preset encryption algorithm and the encrypting unit is configured to encrypt and store the contact information to be stored by the periodically-changed preset encryption algorithm; and/or, a wireless locking unit configured to receive the message containing a terminal locking instruction and lock the local wireless function.

An apparatus for communication based on the pseudo-contact information is provided, which includes: a decoding unit configured to, when a call is initiated, acquire and decode pseudo-contact information of a called party from locally stored pseudo-contact information, wherein the locally stored pseudo-contact information represents the pseudo-contact information generated by encrypting the contact information to be stored by using the preset encryption algorithm and locally stored, and a dialing unit configured to dial by using the decoded contact information of the called party and substitute at least one bit of the decoded contact information of the called party displayed in the dialing process with an identifier.

The apparatus may further include: a changing unit and an encrypting unit, wherein the changing unit is configured to periodically change the preset encryption algorithm and the encrypting unit is configured to encrypt and store the contact information to be stored by the periodically-changed preset encryption algorithm; and/or, a wireless locking unit configured to receive the message containing a terminal locking instruction and lock the local wireless function.

According to the method and the apparatus provided by the embodiments of the disclosure, the contact information to be stored is received and then encrypted according to the preset encryption algorithm to generate the encrypted pseudo-contact information, and the encrypted pseudo-contact information is stored and used for communication, so that the real contact information will not be displayed. Compared with the related art in which data protection for a terminal is limited, complex to operate and not ideal in effect, and particularly a protection safety performance for contact information is lower, the method and the apparatus provided by the embodiments of the disclosure reduce complexity in a protection operation for the contact information and can improve safety performance.

DETAILED DESCRIPTION

Figure 1:
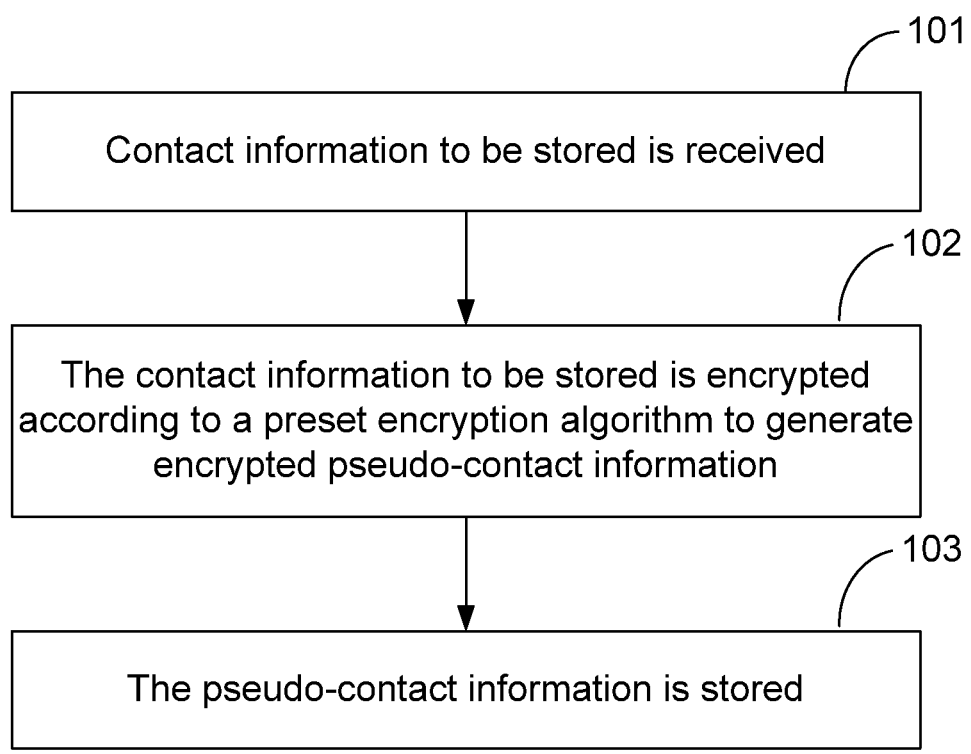
FIG. 1 is a flow diagram showing a method for protecting contact information provided by one embodiment of the disclosure.

In order to solve the problems of higher operation complexity and lower safety performance of the method for protecting contact information stored in the terminal mentioned in the related art, one embodiment of the disclosure provides a method for protecting contact information, which can specifically see the flow shown in FIG. 1:

S101: contact information to be stored is received;

S102: the contact information to be stored is encrypted according to a preset encryption algorithm to generate encrypted pseudo-contact information; and S103: the pseudo-contact information is stored.

In the implementation of S102, there may be many kinds of preset encryption algorithms, for example, adding a digit before each number of the contact information to be stored, or converting each number into another number according to a certain mapping rule, or converting each number into an identifier according to a certain mapping rule, or the like. In order to improve the protection safety for the contact information, the preset encryption algorithm needs to be continuously changed, and one preferable method is: periodically changing the preset encryption algorithm, and encrypting and storing the contact information to be stored by the periodically-changed preset encryption algorithm.

In implementation, contact information of a subscriber is generally stored by a mobile phone or an embedded SIM card of a mobile phone, after the mobile phone is lost, the contact information stored in the mobile phone or the SIM card may be stolen or used by the following ways: searching for the contact information in the SIM card (mobile phone) by using the mobile phone, making a call according to the contact information by the mobile phone (or sending a short message, a multimedia message, an e-mail or performing other wireless operations), inserting the SIM card to another mobile phone to read the contact information, and inserting the SIM card to another mobile phone to make a call according to the contact information (or sending a short message, a multimedia message, an e-mail or performing other wireless operations).

In the following embodiments, the contact information stored in the mobile phone or the SIM card is as an example for description, of course, in implementation, the method for protecting contact information provided by one embodiment of the disclosure is not limited to the mobile phone or the SIM card and is also applied to other terminals, such as a personnel computer, an electronic dictionary, an electronic memo and the like, which can store the contact information.

When the contact information stored in the mobile phone or SIM card is stored by using a flow of a method for protecting contact information as shown in FIG. 1, what stored is pseudo-contact information generated by encrypting the contact information according to the preset encryption algorithm and is not the same as real contact information, therefore, if the mobile phone is lost, and the contact information stored in the mobile phone or the SIM card is searched by the mobile phone, the contact information displayed on the mobile phone or the SIM card is not the real contact information, even if the SIM card is inserted to another mobile phone, the contact information read on the SIM card by the another mobile phone is still not the real contact information, so as to solve the problem that when a personnel mobile phone is stolen a lawless person may call a relative or a friend whose contact information is stored in the mobile phone to bilk or when contact information of a business person is stolen a great economic loss may be brought to a company due to disclosure of a secret.

In implementation, the contact information may be a telephone number, an instant communication number, or an e-mail address and the like.

Figure 2:
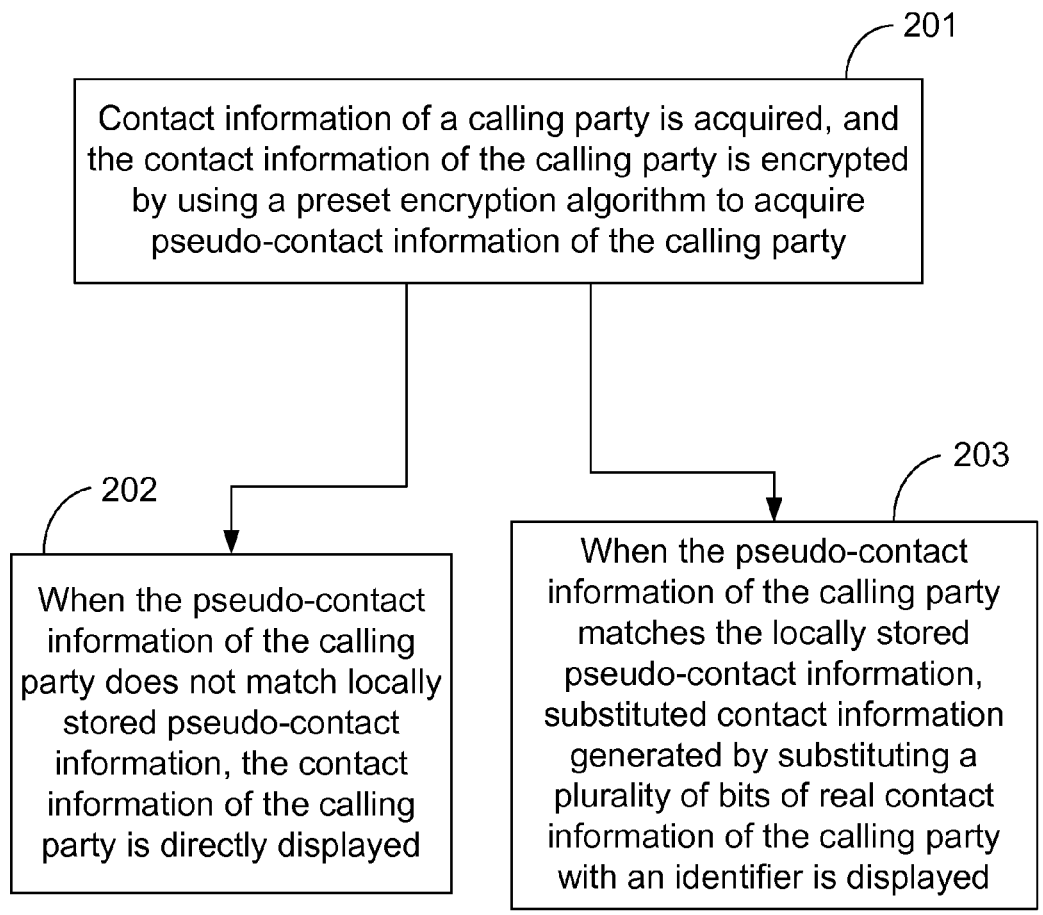
FIG. 2 is a flow diagram showing a first method for communication based on pseudo-contact information provided by one embodiment of the disclosure.

In one embodiment of the disclosure, after the encrypted pseudo-contact information is stored, when a call from another mobile phone is received, the specific processing flow is as shown in FIG. 2, which includes:

S201: contact information of a calling party is acquired, and the contact information of the calling party is encrypted by using a preset encryption algorithm to acquire pseudo-contact information of the calling party, and then S202 or S203 is executed;

S202: when the pseudo-contact information of the calling party does not match locally stored pseudo-contact information, the contact information of the calling party is directly displayed; and S203: when the pseudo-contact information of the calling party matches the locally stored pseudo-contact information, substituted contact information generated by substituting a plurality of bits of real contact information of the calling party with an identifier is displayed.

Wherein, in the implementation of S203, the contact information of the calling party the plurality of bits of which are substituted by with the identifier are displayed, for example, the first few numbers are only displayed, the last few numbers are represented by "*", in a specific example, for example, 13866661234 is displayed as 1386666****. Of course, besides "*", other identifiers such as "#", "@" and the like which are different from a digit are also available. By performing S203, it is possible to effectively prevent the contact information from being revealed and the real contact information stored in the mobile phone or the SIM card from being searched by the mobile phone. Of course, if the contact information is a strange number, and pseudo-contact information corresponding to the strange number does not match locally stored pseudo-contact information, there is no disclosure of the contact information and all the information of the strange number can be displayed.

Figure 3:
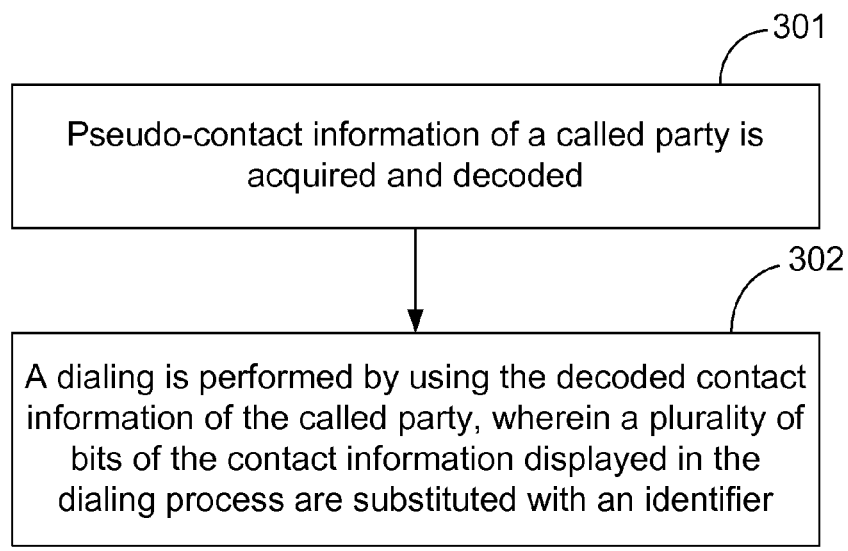
FIG. 3 is a flow diagram showing a second method for communication based on pseudo-contact information provided by one embodiment of the disclosure.

Correspondingly, a mobile phone can be further used for making a call, at the moment, the specific processing flow is as shown in FIG. 3:

S301: pseudo-contact information of a called party is acquired and decoded; and

S302: a dialing is performed by using the decoded contact information of the called party, wherein a plurality of bits of the contact information displayed in the dialing process are substituted with an identifier.

As shown in the flow of FIG. 3, in the implementation of S302, a plurality of bits of the contact information displayed in the dialing process are substituted with an identifier, for example, the first few numbers are only displayed and the last few numbers are represented by "*", in a specific example, for example, 13866661234 is displayed as 1386666****. Of course, besides "*", other identifiers such as "#", "@" and the like which are different from a digit are also available. By performing S302, it is possible to effectively prevent the contact information from being revealed and the real contact information stored in the mobile phone or the SIM card from being searched by the mobile phone.

In implementation, it is also possible to lock a wireless function of the mobile phone, for example, the local wireless function is locked when a message (such as a short message) containing a preset terminal locking instruction is received. When needing to perform such an operation as making a call, sending a short message, a multimedia message and an e-mail and the like, a subscriber judges whether the wireless function of the terminal needs to be disenabled, if yes, the subscriber directly ends the current processing and cannot perform such the operation as making a call, sending a short message, a multimedia message and an e-mail and the like.

Of course, in implementation, in consideration to feeling of the subscriber, a selection mode may be set to select whether to enable or disable the method for protecting contact information provided by one embodiment of the disclosure according to wish of the subscriber, and perform a corresponding feedback and operation, and in the embodiment, a telephone number is selected as the contact information, and the method for protecting contact information provided by one embodiment of the disclosure is called a phone pseudo-storage function in the following text for the purpose of convenience, which is described by a specific embodiment.

Figure 4:
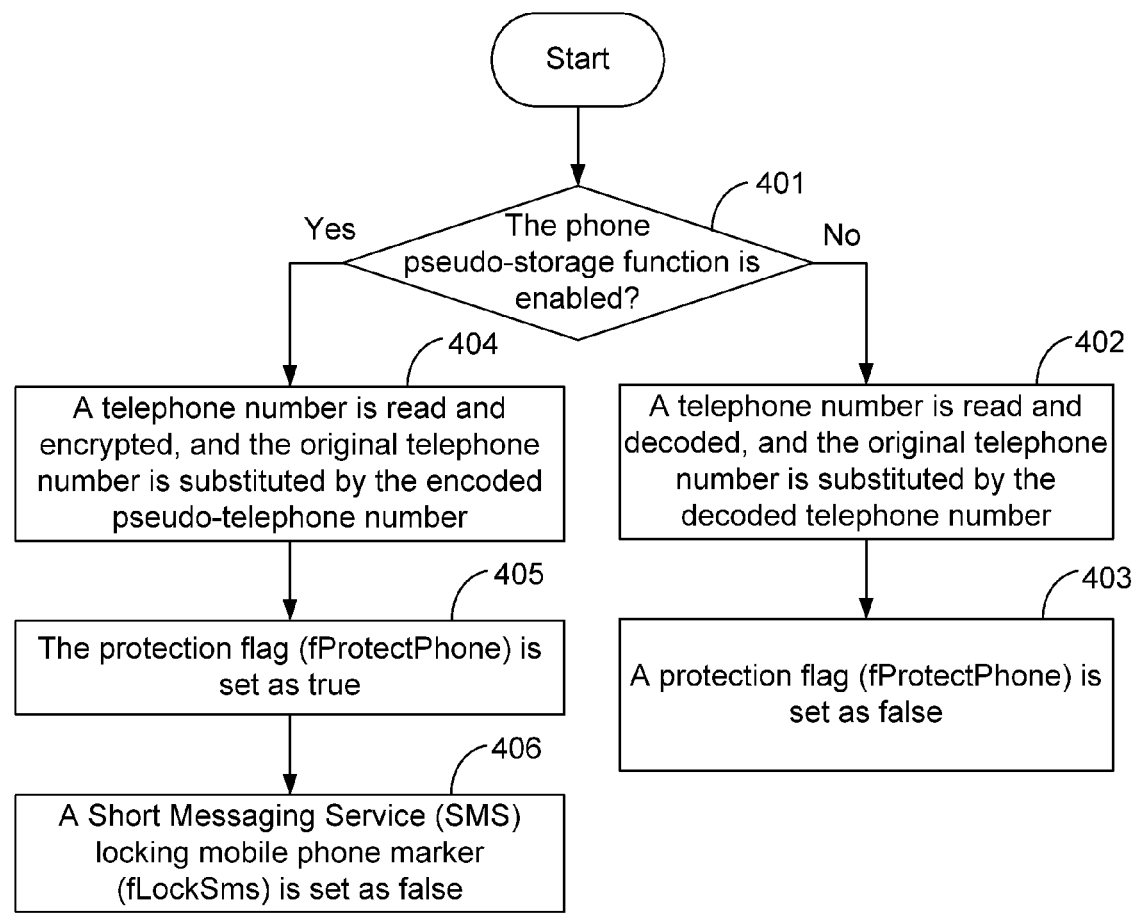
FIG. 4 is a flow diagram showing a first embodiment provided by one embodiment of the disclosure.

A first embodiment shows enabling and disenabling of a phone pseudo-storage function, specifically as shown in FIG. 4:

S401: the phone pseudo-storage function is selected to be enabled or disenabled, when the phone pseudo-storage function is selected to be disenabled, S402 is executed, when the phone pseudo-storage function is selected to be enabled, S404 is executed;

S402: when the phone pseudo-storage function is selected to be disenabled, if the phone pseudo-storage function has been enabled, a telephone number is read and decoded by a system of a mobile phone (the decoded telephone number is a real telephone number), and the original telephone number is substituted by the decoded telephone number, if the phone pseudo-storage function is not enabled, the real telephone number is directly stored and pseudo-storage information is not generated;

S403: a protection flag fProtectPhone is set as false, wherein the step indicates that the mobile phone does not enable the function and the current processing is ended;

S404: when the phone pseudo-storage function is selected to be enabled, a telephone number is read and encrypted by the system of the mobile phone, and the original telephone number is substituted by the encoded pseudo-telephone number;

In implementation, the real telephone number is encrypted into a pseudo-number and a key can be defined by a subscriber himself;

S405: the protection flag fProtectPhone is set as true, wherein the step indicates that the mobile phone enables the function; and S406: a Short Messaging Service (SMS) locking mobile phone flag fLockSms is set as false, wherein the step indicates that the mobile phone is not locked at present and a wireless communication function of the mobile phone can be normally used;

In implementation, contents of an SMS locking mobile phone command are set to be stored in an SMS short command set smsLockCommand, for example, the contents here are set as "abc123", which indicates that when contents of a received short message are "abc123" the wireless function of the mobile phone is locked until it is unlocked.

Figure 5:
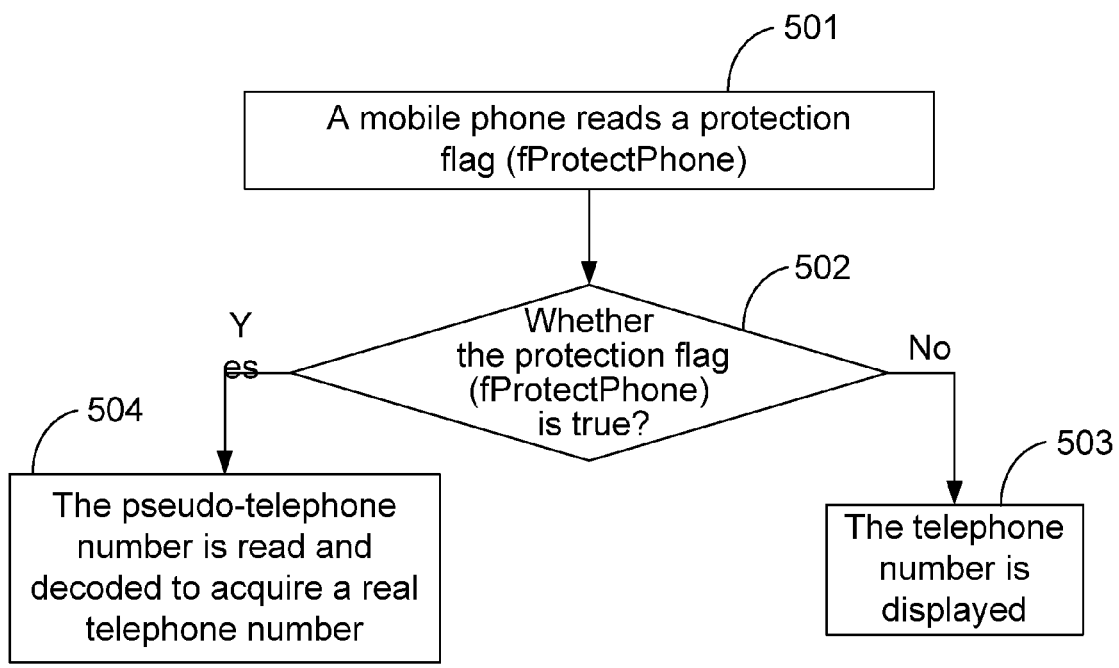
FIG. 5 is a flow diagram showing a second embodiment provided by one embodiment of the disclosure.

A second embodiment shows a flow of displaying a call by a mobile phone, as shown in FIG. 5.

S501: when a subscriber needs to display a telephone number, a mobile phone reads a protection flag fProtectPhone;

S502: the mobile phone determines whether the protection flag fProtectPhon is true, that is, the mobile phone determines whether the mobile phone enables a pseudo-storage function, if the protection flag fProtectPhon is not true, S503 is executed, if the fProtectPhon is true, S504 is executed;

S503: if the protection flag fProtectPhone is not true, the mobile phone displays the telephone number, that is, the mobile phone directly reads a telephone book to display the telephone number; and S504: if the protection flag fProtectPhone is true, the mobile phone reads and decodes the pseudo-telephone number to acquire the real telephone number, that is, the mobile phone reads and decodes the telephone number of the telephone book to acquire a real telephone number;

wherein, in implementation, in order to prevent the real telephone number from being revealed, the last four digits of the telephone number are displayed as *, here, the telephone number can be displayed in other forms, for example, the middle four digits are displayed as *, or only the contact name rather than the telephone number is displayed to hide the real telephone number.

Figure 6:
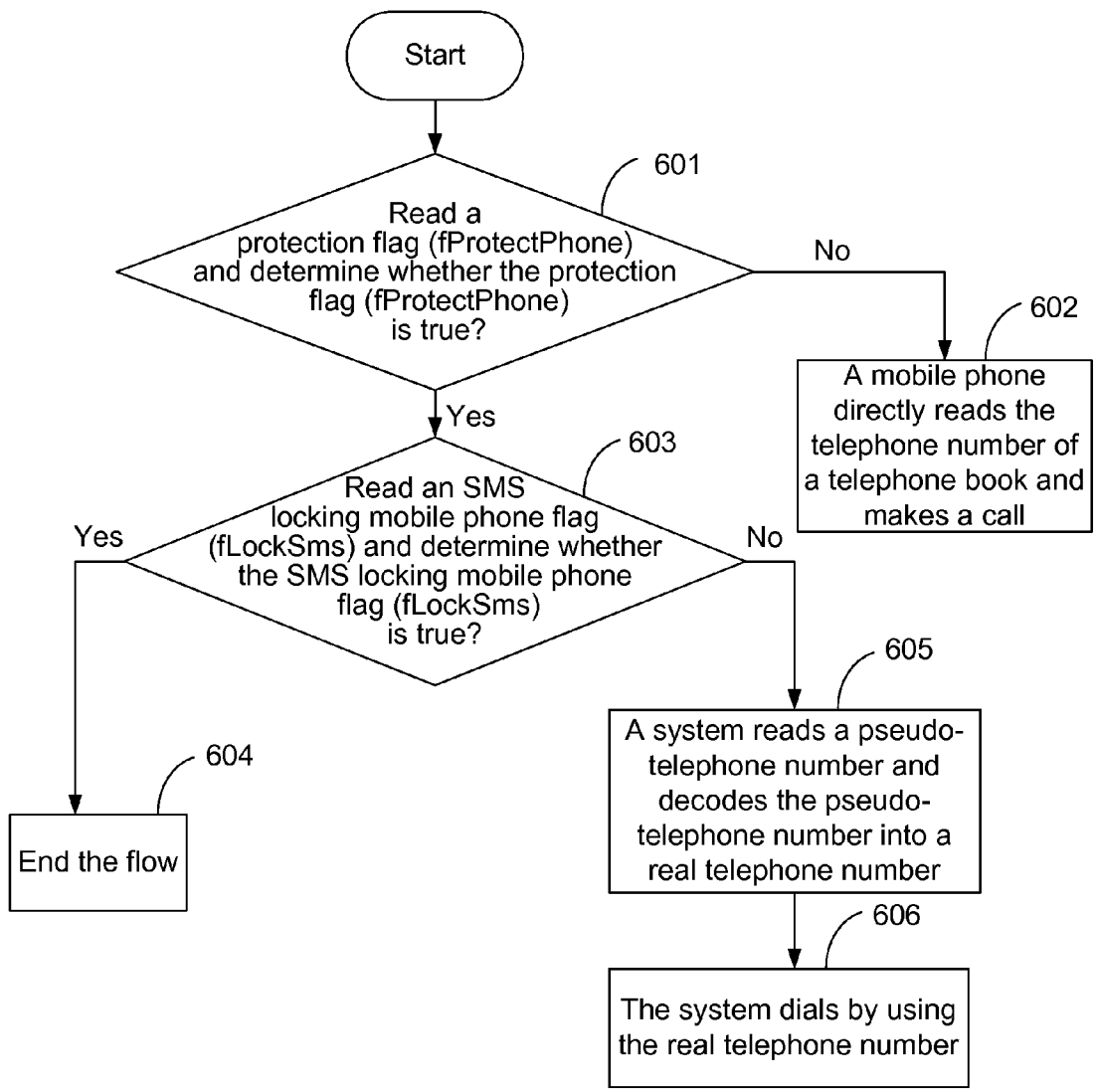
FIG. 6 is a flow diagram showing a third embodiment provided by one embodiment of the disclosure.

A third embodiment shows a flow of dialing a telephone number in a telephone book, as shown in FIG. 6:

S601: when a subscriber makes a call according to contact information in a telephone book by a mobile phone, the mobile phone reads a protection flag fProtectPhone and determines whether the protection flag fProtectPhone is true, that is, the mobile phone determines whether the mobile phone enables a pseudo-storage function, if the protection flag fProtectPhone is not true, S602 is executed, if the protection flag fProtectPhone is true, S603 is executed;

S602: if the fProtectPhone is not true, the mobile phone directly reads the telephone number in the telephone book, displays and dials the telephone number, and the current processing is ended;

S603: if the protection flag fProtectPhone is true, the mobile phone reads an SMS locking mobile phone flag fLockSms and determines whether the SMS locking mobile phone flag fLockSms is true, if the SMS locking mobile phone flag fLockSms is true, S604 is executed, if the SMS locking mobile phone flag fLockSms is not true, S605 is executed;

in addition, execution sequences of determining operations in S601 and S603 can be exchanged;

S604: if the SMS locking mobile phone flag fLockSms is true, then it is indicated that the mobile phone is locked by an SMS instruction and is unavailable for dialing, and the current processing is ended;

S605: if the SMS locking mobile phone flag fLockSms is not true, then it is indicated that the mobile phone is not locked by an SMS instruction and is available for dialing, the system of the mobile phone reads the pseudo-telephone number and decodes it into the real number; and S606: the system of the mobile phone dials the real telephone number, wherein, in order to prevent the real telephone number from being revealed, the last four digits of the telephone number are displayed as * in the dialing process.

Flows of performing other related wireless operations on the mobile phone, such as sending a short message, a multimedia message, an e-mail and the like, are similar to the flow of making a call, thereby needing no further description.

Figure 7:
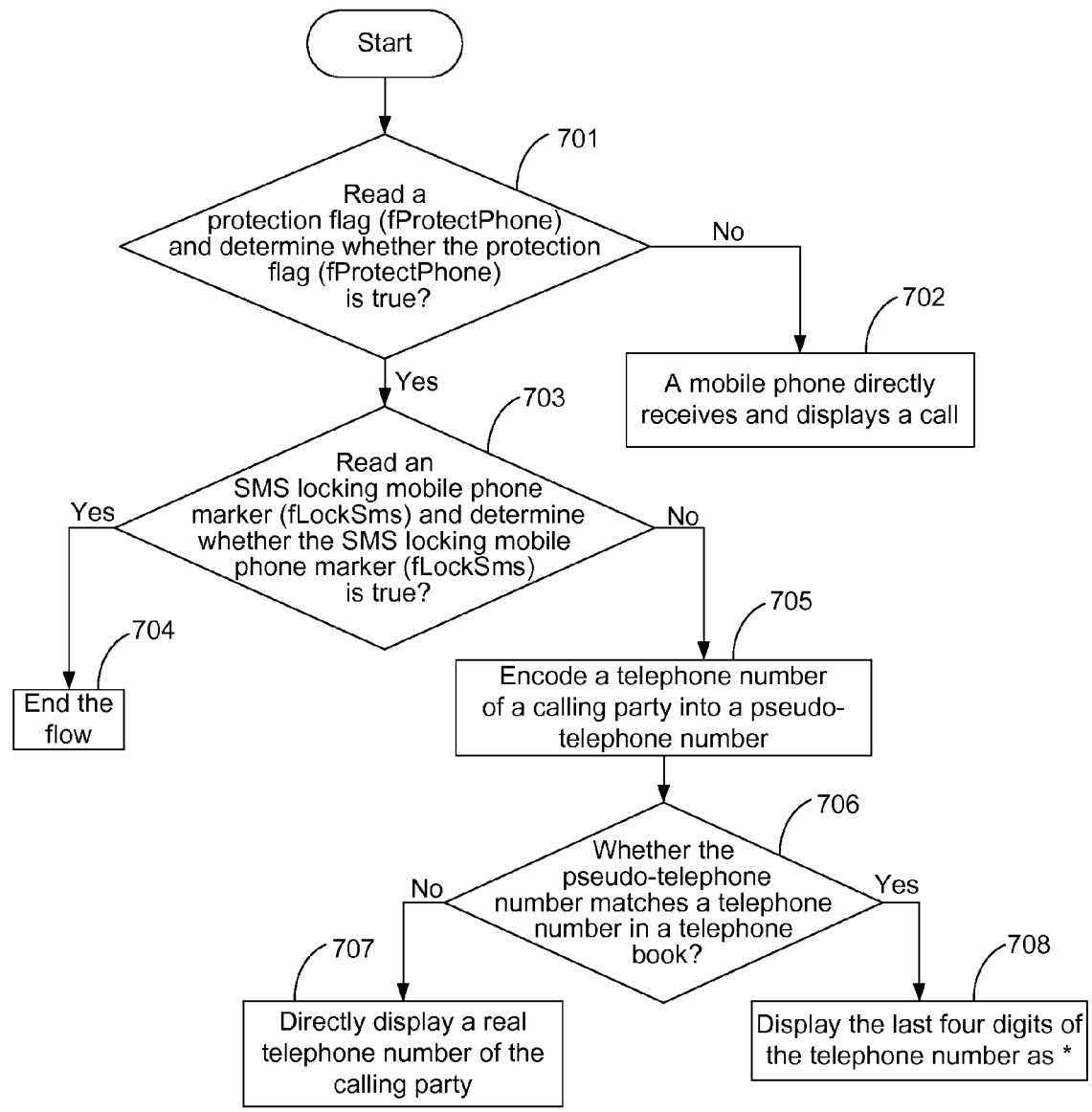
FIG. 7 is a flow diagram showing a fourth embodiment provided by one embodiment of the disclosure.

A fourth embodiment shows a flow of receiving a call, as shown in FIG. 7.

S701: when a mobile phone receives a call, the mobile phone reads a protection flag fProtectPhone and determines whether the protection flag fProtectPhone is true, if the fProtectPhone is not true, S702 is executed, if the protection flag fProtectPhone is true, S703 is executed;

S702: if the protection flag fProtectPhone is not true, the mobile phone directly receives the call and displays the telephone number of the calling part, and the current processing is ended;

S703: if the protection flag fProtectPhone is true, the mobile phone reads an SMS locking mobile phone flag fLockSms and determines whether the SMS locking mobile phone flag fLockSms is true, if the fLockSms is true, S704 is executed, if the SMS locking mobile phone flag fLockSms is not true, S705 is executed;

in addition, execution sequences of determining operations in S701 and S703 can be exchanged;

S704: if the SMS locking mobile phone flag fLockSms is true, then it is indicated that the mobile phone is locked by an SMS instruction and is unavailable for receiving the call, and the current processing is ended;

S705: if the SMS locking mobile phone flag fLockSms is not true, then it is indicated that the mobile phone is not locked by an SMS instruction and is available for receiving the call, encoding the calling number into the pseudo-telephone number;

S706: the mobile phone determines whether the pseudo-telephone number matches the telephone number in the telephone book, if not, S707 is executed, otherwise, S708 is executed;

S707: if the pseudo-telephone number does not match the telephone number in the telephone book, then it is indicated that the calling number is a strange telephone number, and the mobile phone directly displays the real telephone number of the calling party; and S708: If the pseudo-telephone number successfully matches the telephone number in the telephone book, then it is indicated that the calling number is not a strange telephone number, in order to prevent the calling number from being revealed, the mobile phone displays the last four digits of the telephone number as *.

Flows of performing other related passive wireless operations on the mobile phone, such as receiving a short message, a multimedia message, an e-mail and the like, are similar to the flow of receiving a call, thereby needing no further description.

Figure 8:
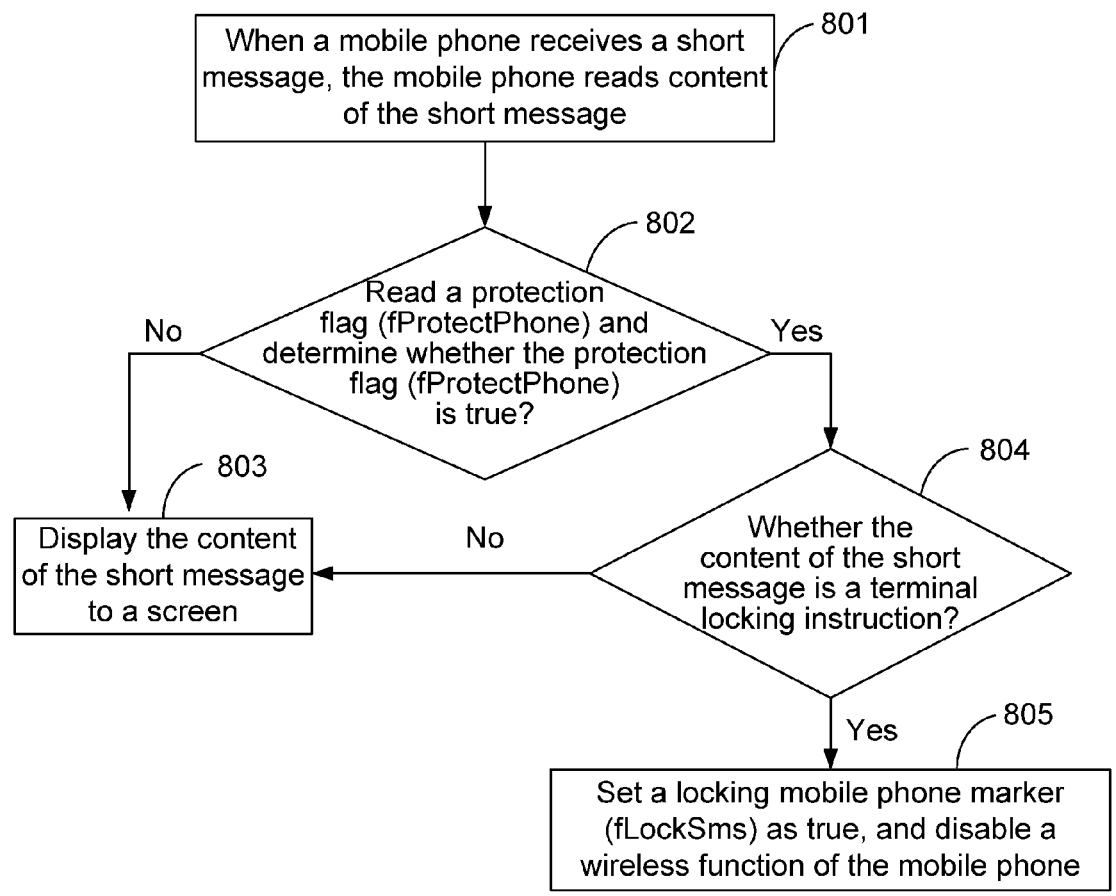
FIG. 8 is a flow diagram showing a fifth embodiment provided by one embodiment of the disclosure.

A fifth embodiment shows a processing flow of receiving an SMS terminal locking instruction, as shown in FIG. 8.

S801: when receiving a short message, a mobile phone reads content of the short message;

S802: the mobile phone reads a protection flag fProtectPhone and determines whether the protection flag fProtectPhone is true, if the protection flag fProtectPhone is not true, S803 is executed, if the protection flag fProtectPhone is true, S804 is executed;

S803: if the protection flag fProtectPhone is not true, the mobile phone displays the content of the short message to a screen, and the current processing is ended;

S804: if the protection flag fProtectPhone is true, the mobile phone determines whether the content of the short message is a terminal locking instruction, for example, the mobile phone determines whether a smsLockCommand is a terminal locking instruction "abc123", wherein, if the content of the short message is not the terminal locking instruction, S803 is executed and the mobile phone displays the content of the short message, if the content of the short message is the terminal locking instruction, S805 is executed; and S805: a locking mobile phone flag fLockSms is set as true to disenable the wireless function of the mobile phone.

According to the method provided by one embodiment of the disclosure, the contact information to be stored is received and then encrypted according to the preset encryption algorithm to generate the encrypted pseudo-contact information, and the encrypted pseudo-contact information is stored and used for communication, so that the real contact information will not be displayed. Compared with the related art in which data protection for a terminal is limited, complex to operate and not ideal in effect, and particularly protection safety performance of contact information is lower, the method provided by one embodiment of the disclosure reduces complexity in a protection operation for the contact information and can improve the safety performance.

Figure 9:
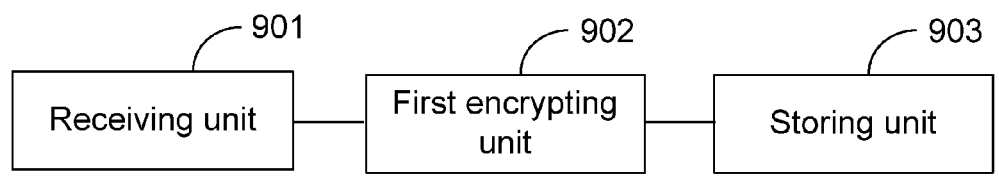
FIG. 9 is a structure diagram showing an apparatus for protecting contact information provided by one embodiment of the disclosure.

Based on the same inventive concept, one embodiment of the disclosure further provides an apparatus for protecting contact information, specifically as shown in FIG. 9, which includes:

a receiving unit 901 configured to receive contact information to be stored;

a first encrypting unit 902 configured to encrypt the contact information to be stored according to a preset encryption algorithm to generate encrypted pseudo-contact information; and a storing unit 903 configured to store the pseudo-contact information.

Figure 10:
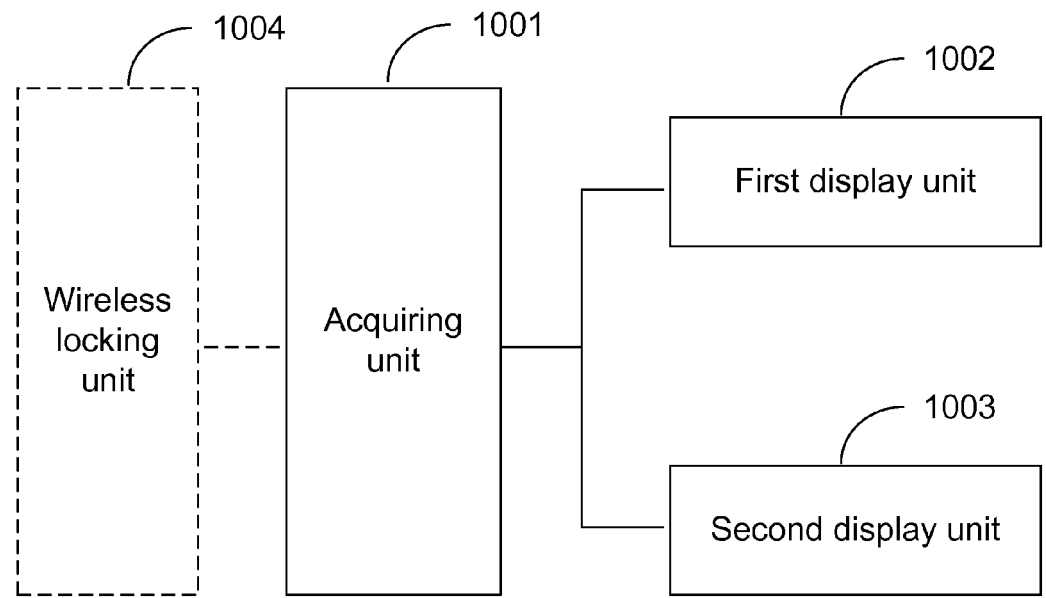
FIG. 10 is a structure diagram showing a first apparatus for communication based on pseudo-contact information provided by one embodiment of the disclosure.

Based on the same inventive concept, one embodiment of the disclosure further provides an apparatus for communication based on pseudo-contact information, specifically as shown in FIG. 10, which includes:

an acquiring unit 1001 configured to, when a call is received, acquire contact information of a calling party, encrypt the contact information of the calling party by using a preset encryption algorithm to acquire pseudo-contact information of the calling party;

a first display unit 1002 configured to, when the pseudo-contact information of the calling party does not match locally stored pseudo-contact information, display real contact information of the calling party, wherein the locally stored pseudo-contact information represents the pseudo-contact information generated by encrypting the contact information to be stored according to the preset encryption algorithm and locally stored; and a second display unit 1003 configured to, when the pseudo-contact information of the calling party matches the locally stored pseudo-contact information, display the substituted contact information generated by substituting a plurality of bits of the real contact information of the calling party with an identifier.

The apparatus can further include: a wireless locking unit 1004 configured to receive a message containing a terminal locking instruction and lock the local wireless function. The wireless locking unit 1004 can be connected with the acquiring unit 1001, when the wireless locking unit 1004 receives a call and is determined that the local wireless function is not locked, the wireless locking unit 1004 to trigger the acquiring unit 1001.

Figure 11:
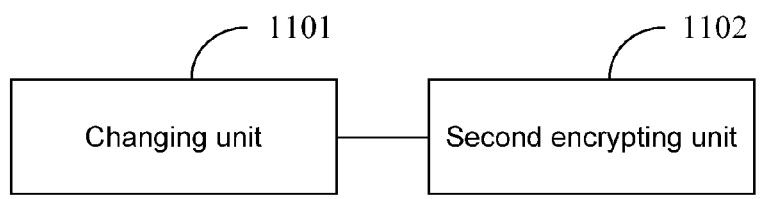
FIG. 11 is a structure diagram showing a second apparatus for communication based on pseudo-contact information provided by one embodiment of the disclosure.

In one embodiment, as shown in FIG. 11, the apparatus for communication based on pseudo-contact information can further include:

a changing unit 1101 configured to periodically change a preset encryption algorithm; and a second encrypting unit 1102 configured to encrypt and store the contact information to be stored by using the periodically-changed preset encryption algorithm.

Figure 12:
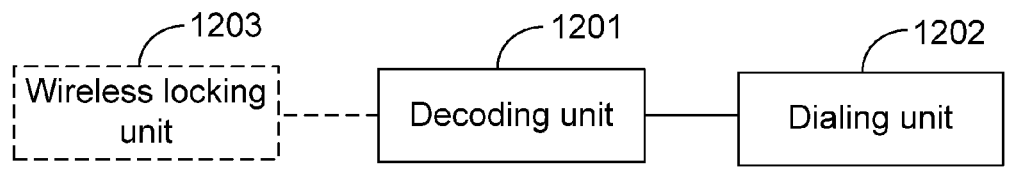
FIG. 12 is a structure diagram showing a third apparatus for communication based on pseudo-contact information provided by one embodiment of the disclosure.

Based on the same inventive concept, one embodiment of the disclosure further provides another apparatus for communication based on pseudo-contact information, specifically as shown in FIG. 12, which includes:

a decoding unit 1201 configured to, when a call is initiated, acquire and decode pseudo-contact information of a called party from locally stored pseudo-contact information, wherein the locally stored pseudo-contact information represents the pseudo-contact information generated by encrypting contact information to be stored according to a preset encryption algorithm and locally stored; and a dialing unit 1202 configured to dial by using the decoded contact information of the called party and substitute a plurality of bits of the decoded contact information of the called party displayed in the dialing process with an identifier.

The apparatus can further include: a wireless locking unit 1203 configured to receive a message containing a terminal locking instruction and lock the local wireless function. The wireless locking unit 1203 can be connected with the decoding unit 1201, when initiating and determining that a local wireless function is not locked, the wireless locking unit 1203 triggers the decoding unit 1201.

According to the apparatus provided by one embodiment of the disclosure, the contact information to be stored is received and then encrypted according to the preset encryption algorithm to generate the encrypted pseudo-contact information, and the encrypted pseudo-contact information is stored and used for communication, so that the real contact information will not be displayed. Compared with the related art in which data protection for a terminal is limited, complex to operate and not ideal in effect, and particularly protection safety performance of contact information is lower, the apparatus provided by one embodiment of the disclosure reduces complexity in a protection operation for the contact information and can improve the safety performance.

Obviously, various modifications and variations can be performed on the disclosure by those skilled in the art within the spirit and scope of the disclosure. In this way, when such modifications and variations of the disclosure are included in the scope of the claims and equivalents thereof, such modifications and variations should further be intended to fall within the disclosure.

The invention claimed is:

1. A method for communication based on pseudo-contact information, comprising:

when a call is received, acquiring contact information of a calling party, and encrypting the contact information of the calling party by using a preset encryption algorithm to acquire pseudo-contact information of the calling party;

when the pseudo-contact information of the calling party does not match locally stored pseudo-contact information, displaying real contact information of the calling party, wherein the locally stored pseudo-contact information represents the pseudo-contact information generated by encrypting the contact information to be stored according to the preset encryption algorithm and locally stored; and when the pseudo-contact information of the calling party matches the locally stored pseudo-contact information, displaying a substituted contact information generated by substituting at least one bit of the real contact information of the calling party with an identifier.

2. The method according to claim 1, wherein the locally storing of the pseudo-contact information further includes: periodically changing the preset encryption algorithm, and encrypting and storing the contact information to be stored by the periodically-changed preset encryption algorithm, and/or storing the pseudo-contact information in a local terminal or a subscriber identity module (SIM) card of the terminal, and/or storing the pseudo-contact information containing any one or combination of telephone number, instant communication number and e-mail address.

3. The method according to claim 2, further comprising:

before encrypting the contact information of the calling party by using the preset encryption algorithm, judging whether a pseudo-contact information storage function is enabled, if yes, encrypting the contact information of the calling party by using the preset encryption algorithm, if not, directly displaying the contact information of the calling party; and/or before acquiring the contact information of the calling party, judging whether a wireless function needs to be disabled, if yes, directly ending the current processing, otherwise, acquiring the contact information of the calling party.

4. The method according to claim 3, further comprising:

before judging whether the wireless function needs to be disabled, receiving a message containing a terminal locking instruction, and locking the local wireless function.

5. The method according to claim 1, further comprising:

before encrypting the contact information of the calling party by using the preset encryption algorithm, judging whether a pseudo-contact information storage function is enabled, if yes, encrypting the contact information of the calling party by using the preset encryption algorithm, if not, directly displaying the contact information of the calling party; and/or before acquiring the contact information of the calling party, judging whether a wireless function needs to be disabled, if yes, directly ending the current processing, otherwise, acquiring the contact information of the calling party.

6. The method according to claim 5, further comprising:

before judging whether the wireless function needs to be disabled, receiving a message containing a terminal locking instruction, and locking the local wireless function.

7. A method for communication based on pseudo-contact information, comprising:

when a call is initiated, acquiring the pseudo-contact information of a called party from locally stored pseudo-contact information and decoding the pseudo-contact information of the called party, wherein the locally stored pseudo-contact information represents the pseudo-contact information generated by encrypting real contact information to be stored by using the preset encryption algorithm and locally stored, and dialing by using the decoded contact information of the called party and displaying, in a dialing process, a substituted contact information generated by substituting at least one bit of the real contact information of the calling party with an identifier.

8. The method according to claim 7, wherein the locally storing of the pseudo-contact information further includes: periodically changing the preset encryption algorithm, and encrypting and storing the contact information to be stored by the periodically-changed preset encryption algorithm, and/or storing the pseudo-contact information in a local terminal or a subscriber identity module (SIM) card of the terminal, and/or storing the pseudo-contact information containing any one or combination of telephone number, instant communication number and e-mail address.

9. The method according to claim 8, further comprising:

before acquiring the pseudo-contact information of the called party, judging whether a pseudo-contact information storage function is enabled, if yes, acquiring the pseudo-contact information of the called party from the locally stored pseudo-contact information, if not, directly displaying the contact information of the called party and making a call according to the contact information of the called party; and/or, before acquiring the pseudo-contact information of the called party, judging whether a wireless function needs to be disabled, if yes, directly ending the current processing, otherwise, acquiring the pseudo-contact information of the called party.

10. The method according to claim 9, further comprising:

before judging whether the wireless function needs to be disabled, receiving a message containing a terminal locking instruction, and locking the local wireless function.

11. The method according to claim 7, further comprising:

before acquiring the pseudo-contact information of the called party, judging whether a pseudo-contact information storage function is enabled, if yes, acquiring the pseudo-contact information of the called party from the locally stored pseudo-contact information, if not, directly displaying the contact information of the called party and making a call according to the contact information of the called party; and/or, before acquiring the pseudo-contact information of the called party, judging whether a wireless function needs to be disabled, if yes, directly ending the current processing, otherwise, acquiring the pseudo-contact information of the called party.

12. The method according to claim 11, further comprising:

before judging whether the wireless function needs to be disabled, receiving a message containing a terminal locking instruction, and locking the local wireless function.

13. An apparatus for communication based on pseudo-contact information, comprising:

an acquiring unit configured to, when a call is received, acquire contact information of a calling party, and encrypt the contact information of the calling party by using the preset encryption algorithm to acquire pseudo-contact information of the calling party;

a first display unit configured to, when the pseudo-contact information of the calling party does not match locally stored pseudo-contact information, display real contact information of the calling party, wherein the locally stored pseudo-contact information represents the pseudo-contact information generated by encrypting the contact information to be stored according to the preset encryption algorithm and locally stored; and a second display unit which is configured to, when the pseudo-contact information of the calling party matches the locally stored pseudo-contact information, display a substituted contact information generated by substituting at least one bit of the real contact information of the calling party with an identifier.

14. The apparatus according to claim 13, further comprising:

a changing unit and an encrypting unit, wherein the changing unit is configured to periodically change the preset encryption algorithm and the encrypting unit is configured to encrypt and store the contact information to be stored by the periodically-changed preset encryption algorithm; and/or, a wireless locking unit configured to receive the message containing a terminal locking instruction and lock the local wireless function.

15. An apparatus for communication based on pseudo-contact information, including:

a hardware circuit;

a decoding unit which is configured to, when a call is initiated, acquire and decode pseudo-contact information of a called party from locally stored pseudo-contact information, wherein the locally stored pseudo-contact information represents the pseudo-contact information generated by encrypting real contact information to be stored by using the preset encryption algorithm and locally stored, and a dialing unit configured to dial by using the decoded contact information of the called party and display, in a dialing process, a substituted contact information generated by substituting at least one bit of the real contact information of the calling party with an identifier.

16. The apparatus according to claim 15, further comprising:

a changing unit and an encrypting unit, wherein the changing unit is configured to periodically change the preset encryption algorithm and the encrypting unit is configured to encrypt and store the contact information to be stored by the periodically-changed preset encryption algorithm; and/or, a wireless locking unit which is configured to receive the message containing a terminal locking instruction and lock the local wireless function.

* * * * *